Feb. 2, 1937.　　　　W. FERRIS　　　　2,069,230
SPEED CONTROLLER FOR PRIME MOVERS
Filed Feb. 27, 1936　　2 Sheets-Sheet 1

INVENTOR
WALTER FERRIS
BY
ATTORNEY

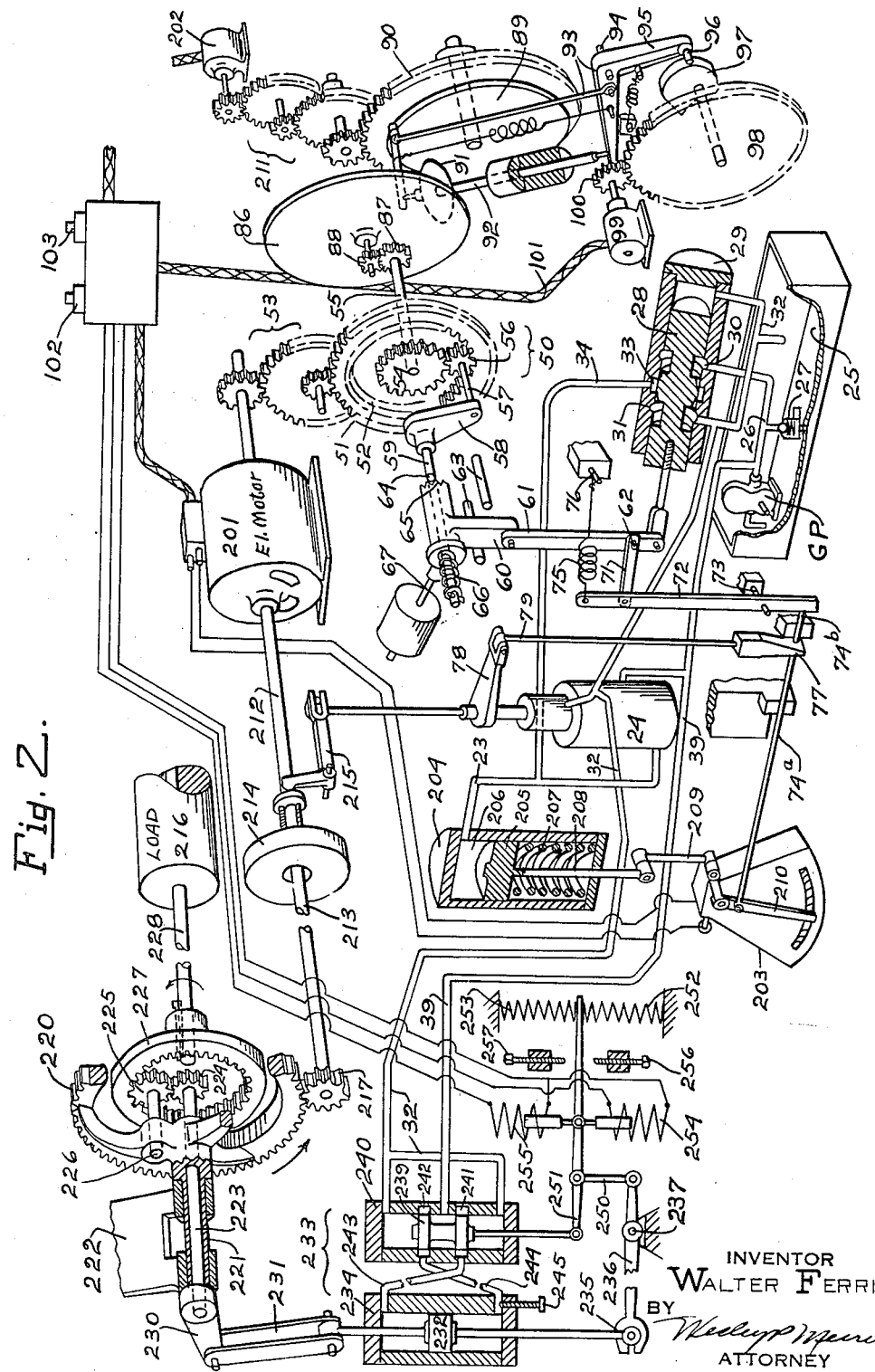

Patented Feb. 2, 1937

2,069,230

UNITED STATES PATENT OFFICE 2,069,230

SPEED CONTROLLER FOR PRIME MOVERS

Walter Ferris, Milwaukee, Wis.

Application February 27, 1936, Serial No. 66,025

20 Claims. (Cl. 60—53)

This invention relates to a speed controller of the type which functions to maintain the total number of revolutions of a prime mover proportional to the total number of revolutions of a standard speed element, such as the speed controller illustrated and described in application Serial No. 47,008, filed October 28, 1935, of which this application is a continuation as to matters common to both applications.

The speed controller is employed to control the speed of a prime mover which is supplied with energy from a suitable source and is required to drive a machine or a group of machines at variable or adjustable speeds. If the prime mover is connected to its load through power transmitting elements such as shafting of such length that the inertia of the load during acceleration will cause considerable torsional deflection thereof, or if the prime mover is a fluid motor which is driven by a compressible motive fluid supplied thereto from a pump through fluid channels of considerable length, and if the controller is adjusted to abruptly increase or decrease the flow of energy to the prime mover and thereby increase or decrease the speed thereof, the inertia of the load will cause the connecting shafting to be twisted and/or the motive fluid to be compressed during acceleration and the connecting shafting to untwist and/or the motive fluid to expand during deceleration before the load can respond to changes in the speed of the prime mover. This permits the load to lag behind or run ahead of the standard speed element even though the prime mover is synchronized with the standard speed element by the devices illustrated and described in the above application.

The present invention has as an object to provide a speed controller of the above type with means for preventing the load from lagging behind or running ahead of the standard speed element due to the yielding of the motive fluid, connecting shafting or other power transmitting means. This is accomplished by imparting to the power transmitting means, substantially at the same instant that the prime mover starts to accelerate, an amount of energy just equal to the work necessary to compress the motive liquid and/or twist the shafting sufficiently to impart the accelerating force to the load, and by absorbing from the power transmitting means, substantially at the same instant that the prime mover starts to decelerate, the amount of energy which the power transmitting means must give up during expansion of the driving liquid and/or untwisting of the shafting in order to reduce the force transmitted by the prime mover to the load to the value required during deceleration.

This energy is imparted to the power transmitting means or absorbed therefrom by an auxiliary prime mover which is adapted to impart the energy required to compress and/or deflect the power transmitting means an instant prior to the beginning of an acceleration and to absorb the energy given up by the expansion and/or deflection of the power transmitting means at the beginning of a deceleration. The necessary positive or negative forces are thus imparted to the load and the power transmitting means just in advance of an acceleration or deceleration with the result that, during the subsequent speed changes of the prime mover, the load changes its speed in synchronism therewith.

The invention is exemplified by the controllers shown schematically in the accompanying drawings in which the views are as follows:

Fig. 2 is a view showing the controller employed to control the speed of an electric motor and provided with means to compensate for the effect of the inertia load.

Fig. 1

Figure 1:
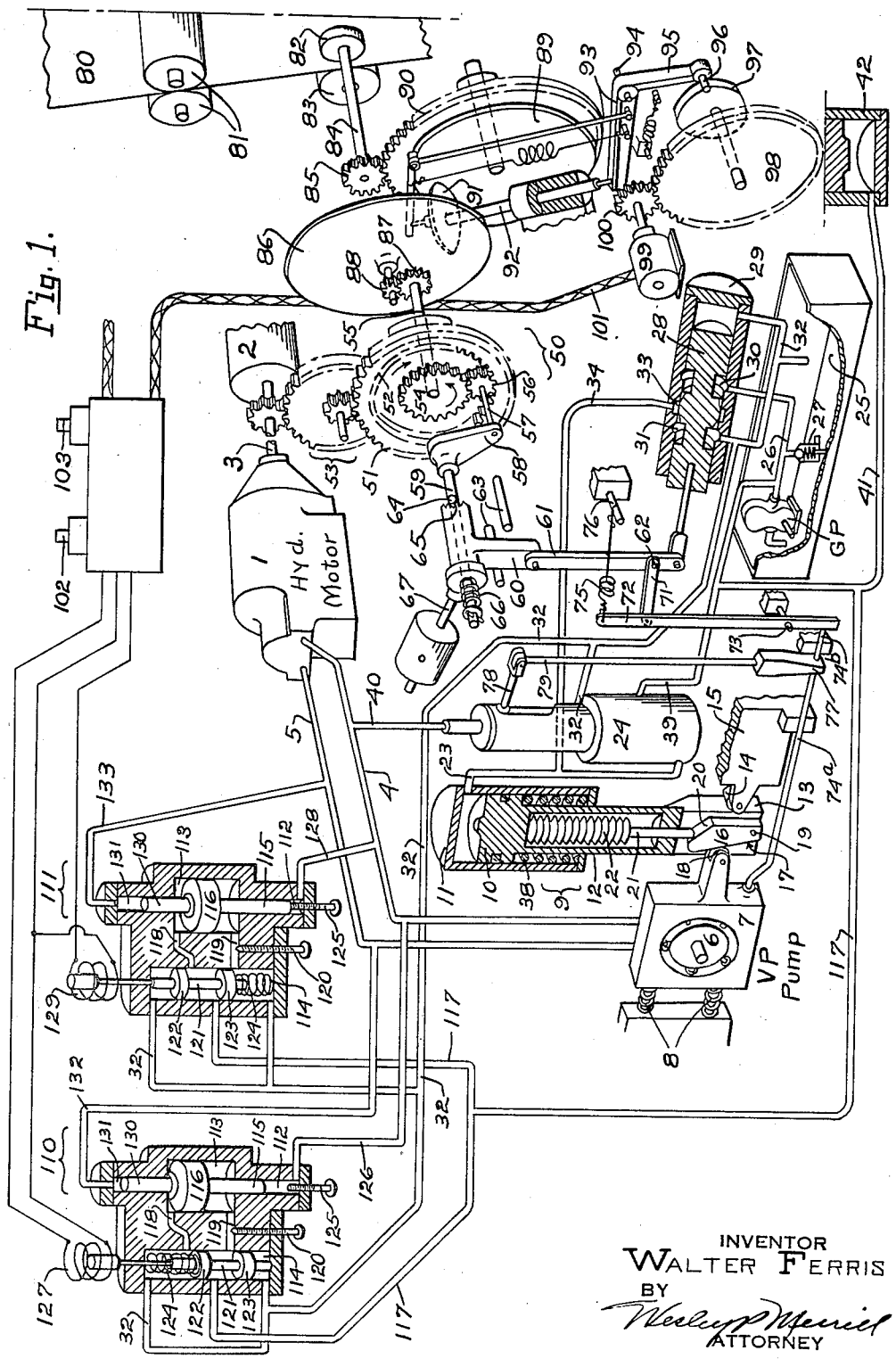
Fig. 1 is a view showing the controller employed to control the speed of a hydraulic motor and provided with means to compensate for the effect of the inertia load.

The controller is shown in this figure as being employed to control the speed of a hydraulic motor 1 which drives a load 2 through a shaft 3. Motor 1 is driven by liquid supplied thereto by a variable displacement pump VP which is connected to motor 1 by a supply pipe 4 and by a return pipe 5 and may have its rotor 6 driven at a constant speed from any suitable source.

The pump shown is of the rolling piston type described and claimed in Patent No. 1,998,984. It has its rotor 6 arranged within a slide block 7 which may be shifted transverse to the rotor axis to change pump displacement and thereby vary the speed of motor 1. Slide block 7 is urged in a direction to decrease pump displacement by springs 8 and is adapted to be shifted in the opposite direction against the resistance of the springs 8 by a hydraulic servo-motor 9 which may act thereon directly, as shown in Fig. 1 of the application referred to above, or through intervening mechanism.

As shown, the servo-motor 9 has its piston 10 fitted in a cylinder 11 and provided with a stem 12 which has a flat guide face 13 formed thereon adjacent its lower end and in contact with a guide roller 14 carried by a stationary support 15 such as a part of the pump casing.

Stem 12 is provided at its lower end with a cam or wedge 16 having an inclined cam face 17 formed thereon to engage a roller 18 carried by slide block 7. Downward movement of piston 10 will cause cam 16 to force roller 18 away from guide roller 14 and thereby move slide block 7 toward the left to increase pump displacement against the resistance of springs 8.

Cam face 17 has a small angle with the cylinder axis so that piston 10 moves through a much greater distance than the resultant movement of slide block 7, thereby obtaining a precise location of slide block 7 and also preventing piston 10 from being affected by reactions from the slide block.

Cam 16 may be fixed to stem 12 but, in order to provide means for preventing sudden changes in slip or leakage and hence in motor speed which would otherwise result from sudden changes in temperature, cam 16 is shown connected to stem 12 by a pivot 19 and provided at its upper end with a cam face 20 which is engaged by a stem 21 carried by an expansible member or bellows 22 arranged inside stem 12.

Bellows 22 is filled with a fluid which expands and contracts in response to variations in temperature and thereby causes the bellows to expand and contract. Expansion of the bellows in response to a rise in temperature advances stem 21 which acts upon cam face 20 and swings the upper end of cam 16 toward the left and increases the angle of cam face 17 so that slide block 7 will be shifted a greater distance in response to a given movement of piston 10. Contraction of the bellows in response to a decrease in temperature has an opposite effect.

Piston 10 is adapted to be urged downward by liquid supplied to the upper end of cylinder 11 through a pipe 23 under the control of two pilot valves one of which is operated slowly by a differential mechanism in response to a variation in ratio between the motor speed and a standard or measuring speed. The other pilot valve forms a part of a surge compensator 24 which functions to quickly make approximate adjustment of pump stroke responsive to sudden pressure changes without waiting until these changes have time to introduce material errors in speed which can only be slowly corrected by the differentially operated pilot valve.

Liquid for operating surge compensator 24 and for advancing piston 10 at a slow rate is supplied by a gear pump GP which draws liquid from a reservoir 25 and discharges it into a low pressure supply pipe 26 having a relief valve 27 connected thereto to limit the pressure therein. The gear pump is ordinarily arranged in the casing of pump VP and driven in unison therewith according to the usual practice.

Delivery of liquid from the gear pump to cylinder 11 is controlled by a pilot valve 28 which is fitted in a casing 29 and operated by differential mechanism to be presently described. Valve casing 29 is provided with a port 30 to which low pressure supply pipe 26 is connected, a port 31 to which a drain pipe 32 is connected for the discharge of liquid into reservoir 25, and a port 33 which is controlled by valve 28 and connected by a pipe 34 to pipe 23 intermediate the ends thereof, the other end of pipe 23 being connected to the lower end of surge compensator 24.

When pilot valve 28 is shifted toward the left, liquid will flow from the gear pump through pipe 26, valve casing 29 and pipes 34 and 23 to the upper end of cylinder 11 and force piston 10 downward, thereby causing cam face 17 to move over roller 18 and force slide block 7 toward the left to increase pump displacement with the resultant increase in the speed of motor 1.

When the pilot valve is shifted toward the right, liquid may escape from the upper end of cylinder 11 so that piston 10 and the cam 16 may rise and springs 8 may move slide block 7 toward the right to decrease pump displacement. Piston 10 may be moved upward by the action of the springs 8, but cylinder 11 ordinarily has a helical compression spring 38 arranged in the lower end thereof and urging piston 10 upward to thereby relieve springs 8 of this burden.

Adjustment of pump VP under the control of pilot valve 28 corrects variations in motor speed after the variations occur. In order to prevent such variations in load from having a material effect upon motor speed, the controller is provided with the surge compensator 24 which has not been illustrated nor described in detail for the reason that it is fully illustrated and described in the application referred to above. It is sufficient to state that it is operated by liquid supplied to it by the gear pump through a pipe 39 and that it is connected to the supply pipe 4 by a pipe 40 so that it is subjected at all times to pump pressure. When a sudden increase in load occurs, the resultant increase in pressure is transmitted through pipe 40 and causes surge compensator 24 to eject liquid through pipe 23 into cylinder 11 and thereby cause piston 10 to shift slide block 7 toward the left to increase pump displacement. In order that adequate motive liquid for operating surge compensator 24 may be instantly available, pipe 39 may be connected by a pipe 41 to an accumulator 42 which is kept charged by the gear pump.

It is to be understood that the several parts of the surge compensator are so proportioned in respect to cylinder 11 that the volume of liquid ejected by the surge compensator into cylinder 11 in response to a given increase in pump pressure will be just enough to shift slide block 7 the correct distance to increase pump delivery by an amount equal to the increase in slip due to that increase in pressure.

When a sudden decrease in load occurs, the resultant decrease in pump pressure permits surge compensator 24 to withdraw a proportional amount of liquid from cylinder 11 thereby permitting spring 38 to raise piston 10 which permits springs 8 to shift slide block 7 toward the right to decrease pump displacement by an amount equal to the decrease in slip due to the decrease in pressure.

The surge compensator thus functions to prevent major variations in motor speed due to sudden or wide variations in motor load with the resultant variations in pump pressure. Any minor variation in motor speed which the surge compensator fails to anticipate and prevent is corrected by delivery of liquid from the gear pump to cylinder 11 or by permitting liquid to escape from cylinder 11 under the control of pilot valve 28 which is operated in response to a variation in the ratio between the motor speed and a standard or measuring speed.

The mechanism for operating pilot valve 28 includes a differential 50 which has one of its legs driven by motor 1, a second leg driven at a standard or measuring speed and its third leg connected to pilot valve 28 whereby any variation in the ratio between the speed of the first leg and the speed of the second leg will cause the third leg to rotate and shift valve 28.

As shown, one leg of differential 50 includes an external ring gear 51 and an internal ring gear 52 which are fixed for rotation with each other and rotated in one direction by motor 1 through a gear train 53 at a speed proportional to the speed of motor 1. The second leg includes a sum gear 54 and a shaft 55 which are fixed for rotation with each other and rotated in the opposite direction at a standard or measuring speed, and the third leg includes a planet pinion 56 which meshes with gears 52 and 54 and is journaled upon a shaft 57 carried by an arm 58 fixed upon a control shaft 59. The arrangement is such that pinion 56 will rotate upon a stationary axis as long as the gears 52 and 54 rotate at the same peripheral speed but any variation in the speed of one gear or the other will cause pinion 56 to travel around sun gear 54 in one direction or the other to thereby cause arm 58 to rotate shaft 59.

Motion is transmitted from shaft 59 to pilot valve 28 through two levers 60 and 61. Lever 60 is fixed for rotation with shaft 59 and has its free end pivoted to the upper end of lever 61 which is pivoted intermediate its ends upon a pin 62 and has its lower end connected to the stem of pilot valve 28. When shaft 59 is rotated, due to gears 52 and 54 being rotated at different peripheral speeds, lever 60 will swing lever 61 upon pivot 62 and cause it to shift pilot valve 28 in one direction or the other depending upon the direction in which planet pinion 56 is carried around sun gear 54.

In order to prevent lever 60 from being rotated beyond its useful range, it has its hub journaled upon shaft 59 and its depending arm arranged between two stationary stops 63. A pin 64 is inserted through shaft 59, notches 65 are formed in the inner end of the hub of lever 60, and a spring 66 is arranged upon shaft 59 to urge lever 60 along the shaft and hold pin 64 in one of notches 65, thereby providing a snap clutch which, by disengaging pin 64 from a notch 65, will yield and permit rotation of shaft 59 until pin 64 engages the next adjacent notch should shaft 59 attempt to rotate lever 60 beyond the limits prescribed by stops 63. Lever 60 may also be yieldingly urged in one direction, as by having a weighted arm 67 fixed thereto, to prevent any back lash between pinion 56 and gears 52 and 54 from affecting the accuracy of adjustment of pilot valve 28.

When pilot valve 28 is shifted in either direction due to rotation of shaft 59, the resultant motion imparted to slide block 7 by the servomotor is transmitted through a follow-up mechanism to pilot valve 28 in the opposite direction so that pilot valve 28 is returned to its neutral position by the follow-up mechanism as soon as rotation of shaft 59 ceases.

As shown, pin 62 is arranged in one end of a link 71 which has its other end pivoted to a lever 72 intermediate the ends thereof. Lever 72 is pivoted intermediate its ends upon a stationary pivot 73 and has its lower end in engagement with one end of a rod 74 which is supported in stationary guides and has its other end attached to slide block 7. The lower end of lever 72 is held in engagement with rod 74 by a spring 75 which has one of its ends attached to the upper end of lever 72 and its other end attached to a stationary pin 76.

The arrangement is such that movement of slide block 7 causes pivot pin 62 to be moved in a direction to close pilot valve 28 at the same time and at the same proportional speed that lever 60 swings lever 61 in a direction to open pilot valve 28 so that, the instant lever 60 ceases to move, the follow-up mechanism closes pilot valve 28 and thereby stops further movement of slide block 7.

Since adjustment of pump displacement by surge compensator 24 would alter the adjustment of the follow-up mechanism, it is necessary to compensate for any such adjustments made by the surge compensator. As shown, this is accomplished by dividing rod 74 into two sections 74ᵃ and 74ᵇ which are spaced apart by a wedge 77 pivoted to an arm 78 by a rod 79. Arm 78 is fixed to a part of surge compensator 24 and is moved therewith by any variation in pump pressure a distance exactly proportional to the distance slide block 7 is moved to correct for that variation in pump pressure so that, when slide block 7 is shifted by surge compensator 24, wedge 77 functions to hold the lower end of follow-up lever 72 stationary, as fully explained in the application referred to above.

Slide block 7 is shifted by the above described control mechanism to maintain the speed of motor 1 proportional to a standard or measuring speed such as the speed of a moving web 80 from which motion is transmitted to the sun gear 54 of differential 50 through a variable speed friction disk transmission such as that illustrated and described in the application referred to above.

Web 80 is shown as being moved by a pair of power driven rolls 81 and as having a measuring roller 82 arranged in contact therewith above an abutment roller 83 which enables roller 82 to maintain uniform friction contact with web 80. Roller 82 is connected by a shaft 84 to a gear 85 through which it transmits motion to the friction disk transmission from the traveling web 80.

The friction disk transmission is shown as having its driven disk 86 connected to shaft 55 by a gear 87 and a pinion 88 and its driving disk 89 arranged parallel to disk 86 and fixed for rotation with a gear 90 which meshes with gear 85. Rotation is imparted to driven disk 86 from driving disk 89 through a disk 91 which is arranged transverse to disks 86 and 89 and has its periphery in contact with the adjacent faces thereof.

Disk 91 is arranged upon a shaft 92 which is carried by a jointed frame 93 having the lower side member thereof pivoted upon a stationary pin 94. A lever 95 is fixed to the lower side member of frame 93 and provided at its lower end with a pin or roller 96 to engage a speed changing cam 97 which is fixed for rotation with a gear 98.

Since the friction disk transmission is fully illustrated and described in the application referred to above, a detailed description thereof will not be given herein. It is deemed sufficient to state that, when cam 97 is rotated, frame 93 will be swung upon pin 94 and move disk 91 relative to the axes of disks 86 and 89 to vary the speed of shaft 55 relative to the speed of shaft 84 and thereby vary the speed of motor 1 relative to the speed of web 80.

Cam 97 may be rotated by a reversible electric motor 99 arranged in a stationary position and having a pinion 100 fixed to its shaft and meshing with gear 98. Motor 99 is shown as being operated by current supplied thereto through a cable 101 under the control of two push button switches 102 and 103.

Assuming for the purpose of illustration that load 2 is a rotary paper cutter driven by motor 1, that web 80 is a strip of paper being fed to the paper cutter by rolls 81 which are driven by a paper making machine, and that pump VP is either driven in synchronism with the paper making machine or, if the speed of the paper making machine is not varied through too great a range, it is driven from any suitable constant speed source, the apparatus will operate as follows:

As long as the load on motor 1 and the speed of web 80 remain unchanged, the axis of planet pinion 56 will remain stationary and the controller will not make any adjustment of pump displacement.

If the load on motor 1 should increase and cause an increase in the slip of the pump and motor with a resultant decrease in motor speed, or if the speed of web 80 should increase, sun gear 54 would be rotated at a greater peripheral speed than gear 52 and would carry planet pinion 56 around with it and thereby cause shaft 59 to rotate in a counterclockwise direction.

Shaft 59 would swing the lower end of lever 60 toward the right as viewed in the drawings, and lever 60 would swing lever 61 upon pin 62 and cause it to shift pilot valve 28 toward the left, thereby permitting liquid from the gear pump to flow through pipes 34 and 23 to cylinder 11 and move piston 10 downward. Piston 10 would move slide block 7 toward the left to increase pump displacement until pump VP was driving motor 1 at the speed determined by the speed of shaft 55.

As slide block 7 moved toward the left, it would move rod 74 with it and permit spring 75 to swing lever 72 upon pivot 73. Lever 72 would move link 71 toward the right so that pilot valve 28 would be returned to its initial position as soon as differential 50 ceased to transmit motion thereto, thereby preventing further movement of slide block 7.

If switch 102 should be closed, motor 99 would be energized and rotate cam 97 in a counterclockwise direction, and cam 97 would cause lever 95 to swing frame 93 upward upon pivot 94 and thereby move disk 91 upward away from the axis of disk 89 and toward the axis of disk 86. Since disk 89 would continue to rotate at its initial speed, moving disk 91 upward would cause disk 86 to rotate at a faster speed.

Rotating disk 86 at a faster speed would cause sun gear 54 to rotate at a faster speed and thereby cause pump displacement to increase, as explained above, until motor 1 was rotating at a new speed which would have the same ratio to the new speed of disk 86 that its former speed had to the former speed of disk 86. The controller would then continue to function in the above described manner to maintain that ratio.

If the load on motor 1 should decrease and thereby cause a decrease in the slip of the pump and motor with a resultant increase in motor speed, or if the speed of web 80 should decrease, gear 52 would be driven at a greater peripheral speed than sun gear 54 and would carry planet pinion 56 around with it.

Planet pinion 56 would cause shaft 59 to rotate in a clockwise direction and shift pilot valve 28 toward the right to open port 33 to port 31 and permit liquid to escape from cylinder 11, thereby permitting spring 38 to raise piston 10 and springs 8 to shift slide block 7 toward the right until motor speed was reduced to the speed determined by the speed of shaft 55 and sun gear 54.

As slide block 7 moved toward the right, rod 74 would move with it and swing lever 72 upon pivot 73. Lever 72 would move link 71 toward the left so that pilot valve 28 would be returned to its initial position as soon as differential 50 ceased to transmit motion thereto, thereby preventing further movement of slide block 7.

If switch 103 should be closed, motor 99 would be energized and rotate cam 97 in a clockwise direction, and cam 97 would cause lever 95 to swing frame 93 downward upon pivot 94 and thereby move disk 91 downward away from the axis of disk 86 and toward the axis of disk 89. Since disk 89 would continue to rotate at its initial speed, moving disk 91 downward would cause disk 86 to rotate at a slower speed.

Rotating disk 86 at a slower speed would cause sun gear 54 to rotate at a slower speed and thereby cause pump displacement to be decreased, as explained above, until motor 1 was rotating at a new speed which would have the same ratio to the new speed of disk 86 that its former speed had to the former speed of disk 86. The controller would then continue to function in the above described manner to maintain that ratio.

Due to inertia, the power required to drive a load is greater during periods of acceleration and less during periods of deceleration than when the load is being driven at a substantially uniform speed.

If shaft 3 should be so short and rigid that it would not yield perceptibly under the inertia load, and if motor 1 should be placed at such a distance from pump VP that the connecting channels contained a considerable volume of liquid, and if no means were provided to compensate for the inertia load, the first effect of increasing pump displacement by closing switch 102 would be to compress the liquid in supply pipe 4 until the pressure in hydraulic motor 1 was raised sufficiently to provide the additional force necessary to accelerate the load.

Motor 1 would thus lag behind the standard speed during a period of acceleration and, since the pressure required to accelerate a load is greater than the pressure required to keep it running, the liquid in supply pipe 4 would expand at the end of the accelerating period and cause motor 1 to momentarily overrun the standard speed. Conversely, motor 1 would overrun the standard speed during a period of deceleration and momentarily lag behind the standard speed at the end of the period of deceleration.

If supply pipe 4 should contain such a small volume of liquid that the amount the liquid could be compressed would be negligible, if motor 1 should be placed at such a distance from load 2 that shaft 3 or other connecting shafting would be so long that it would twist under the effect of the inertia load, and if no means were provided to compensate for the inertia load, the additional force (either positive or negative) required to accelerate or decelerate the load would cause a variation in the twist or torsional deflection of the connecting shafting with the result that the load would not be accelerated nor decelerated synchronously with the acceleration or deceleration of the standard speed element.

If motor 1 should be connected to pump VP by channels containing a considerable volume of liquid and to the load by shafting of considerable length and no means were provided to compensate for the inertia load, the additional force (either positive or negative) required to vary the speed of the load would cause a variation in the density of the liquid in the connecting channels and in the torsional deflection of the shafting with the result that the load would not be accelerated nor decelerated synchronously with the standard speed element.

Such momentary departures from the standard speed are of no importance when the prime mover controlled by the apparatus is employed to drive certain machines while it may be very disadvantageous under other circumstances such for example as when the prime mover is employed to drive a rotary paper cutter which cuts strips of paper into sheets of a predetermined length.

For the purpose of illustration, let it be assumed that load 2 is a rotary paper cutter, that web 80 is a strip of paper, and that the rolls 81 are driven by a paper making machine and feed the strip of paper therefrom to the paper cutter which cuts it into sheets.

During normal operation, the controller would function in the manner described to keep the speed of motor 1 synchronized with the speed of disk 86 and, since the speed of disk 86 is synchronized with the speed of strip 80, cutter 2 would cut sheets of a uniform length. Then, if switch 102 or 103 should be closed to vary the speed of disk 86 relative to the speed of strip 80 and thereby vary the speed of motor 1, and if no means were provided to compensate for the inertia load, the speed of motor 1 would not synchronize with the speed of disk 86 during and immediately following the period of acceleration or deceleration and cutter 2 would not cut sheets the right length during that time.

In order to compensate for the inertia load and thereby keep the speed of motor 1 substantially in synchronism with the standard or measuring speed at all times, the controller is provided with an acceleration compensator 110 and a deceleration compensator 111 which are actuated simultaneously with switches 102 and 103, respectively, and are substantially the same as to structure but opposite as to function.

Each compensator consists primarily of a pump for varying the pressure in supply pipe 4, a hydraulic motor for operating the pump, and a valve for controlling the motor, all of which are shown as having the cylinders thereof formed integral with each other. As shown, each compensator is provided with a casing having a pump cylinder 112 and a motor cylinder 113 formed therein concentric with each other and a valve cylinder 114 formed therein parallel to the other cylinders.

Pump cylinder 112 is considerably smaller than motor cylinder 113 and has fitted therein a piston 115 which is connected to a piston 116 fitted in motor cylinder 113. Piston 116 is adapted to be operated by liquid supplied to cylinder 113 from gear pump GP through a pipe 117 which has one of its ends connected to pipe 41 and its other end branched and connected to the valve cylinder 114 of both compensators intermediate the ends thereof.

Each valve cylinder 114 is connected at its upper and lower ends to drain pipe 32 and communicates intermediate its ends with motor cylinder 113 at the upper end thereof through a passage 118 and at the lower end thereof through a passage 119 which has a needle valve 120 inserted therein to limit the rate of flow therethrough and thereby limit the rate of movement of motor piston 116.

The delivery of liquid to motor cylinder 113 is controlled by a valve 121 which is arranged in valve cylinder 114 and has two spaced apart heads or pistons 122 and 123 closely fitted therein. Valve 121 is urged in one direction by a spring 124 and is adapted to be moved in the opposite direction by a solenoid connected in circuit with speed change motor 99. Operation of valve 121 permits liquid to flow to and from motor cylinder 113 and operate piston 116 which will operate pump piston 115, the stroke of piston 115 being limited by an adjusting screw 125 threaded through the end of cylinder 112.

Compensator 110 has the lower end of its cylinder 112 connected to supply pipe 4 by a pipe 126, its spring 124 arranged in the upper end of valve cylinder 114 and the stem of its valve 121 connected to a solenoid 127 which is controlled by switch 102. Valve 121 is normally held against the bottom of cylinder 114 by spring 124 in which position passage 118 is open to drain pipe 32 and passage 119 is open to pipe 117 so that piston 116 is held up against the top of cylinder 113 by liquid supplied from pump GP.

Compensator 111 has the lower end of its cylinder 112 connected to supply pipe 4 by a pipe 128, its spring 124 arranged in the lower end of valve cylinder 114 and the stem of its valve 121 connected to a solenoid 129 which is controlled by switch 103. Valve 121 is normally held against the top of cylinder 114 by spring 124 in which position passage 119 is open to drain pipe 32 and passage 118 is open to pipe 117 so that gear pump liquid acting upon piston 116 holds piston 115 down against adjusting screw 125.

When switch 102 is closed, motor 99 will rotate cam 97 to increase pump displacement, as previously explained, and solenoid 127 will be simultaneously energized and move valve 121 of compensator 110 upward against the top of cylinder 114 in which position pistons 122 and 123 are above passages 118 and 119, respectively, so that liquid from gear pump GP may flow through pipes 26, 39, 41 and 117, cylinder 114 and passage 118 to the upper end of cylinder 113 and force piston 116 downward, liquid being expelled from the lower end of cylinder 113 through passage 119 and cylinder 114 into drain pipe 32. Piston 116 will move piston 115 downward and cause it to eject liquid from cylinder 112 through pipe 126 into supply pipe 4 until it is stopped by adjusting screw 125.

If shaft 3 is so short and stiff that the force required to accelerate the load will not twist it and if pipe 4 contains a considerable volume of liquid, screw 125 is so adjusted that the volume of liquid ejected from cylinder 112 into pipe 4 is just sufficient to raise the pressure in pipe 4 by the amount necessary to transmit the additional force required to accelerate the load.

If pipe 4 contains such a small amount of liquid that the force required to accelerate the load will not compress the liquid therein an appreciable amount and if shaft 3 or other shafting connecting motor 1 to its load is so long that the force required to accelerate the load will cause torsional deflection thereof, screw 125 is so adjusted that the volume of liquid ejected from cylinder 112 into pipe 4 is just sufficient to rotate the rotor of motor 1 through the correct angular distance required to twist shaft 3 or other shafting the amount it would be twisted by the force required to accelerate the load.

If pipe 4 contains a considerable volume of liquid and if the shafting connecting motor 1 to its load is so long that it will be twisted by the force required to accelerate the load, screw 125 is so adjusted that the volume of liquid ejected from cylinder 112 into pipe 4 is just sufficient to perform both of the above mentioned functions, that is, to raise the pressure in pipe 4 by the amount necessary to transmit the accelerating force and to cause motor 1 to add the necessary twist to the shafting.

The increase in displacement of pump VP during acceleration will be gradual but piston 115 will move to its new position immediately and promptly inject enough liquid into pipe 4 to provide the accelerating force. Therefore, as pump displacement is gradually increased, the speed of motor 1 will increase proportionally and maintain its former ratio to the speed of disk 86 for the reason that the additional work required to compress the driving liquid, to add the necessary tortional deflection to the shafting, or to do both, has been supplied from an outside source of energy.

When switch 102 is opened at the end of the period of acceleration, motor 99 immediately stops and there is no further increase in pump displacement but, since the force required to accelerate the load is greater than the force required to keep it running, energy stored in the compressed liquid, in the twisted shafting or in both would cause motor 1 to overrun its measuring speed if it were not for the acceleration compensator.

However, the instant switch 102 is opened, solenoid 127 is deenergized and spring 124 shifts valve 121 to its lower position. Liquid from pump GP then enters the lower end of cylinder 113 and forces piston 116 upward and retracts piston 115 which withdraws from pipe 4 the same amount of liquid that it previously injected therein, thereby in one case decreasing the volume and thus decreasing the pressure in pipe 4 and in the other case decreasing the torsional deflection of shaft 3 the same amount that it was previously increased to accelerate the load. The operation of the piston 115 in each direction would be substantially instantaneous were it not for the needle valve 120 which is adjusted to slow down the action of piston 116 just enough to prevent shock.

When switch 103 is closed, motor 99 will rotate cam 97 to decrease pump displacement, as previously explained, and solenoid 129 will be simultaneously energized and move valve 121 of compensator 111 downward against the bottom of cylinder 114 in which position pistons 122 and 123 are below passages 118 and 119, respectively, so that liquid from pump GP may flow through pipes 26, 39, 41 and 117, cylinder 114 and passage 119 to the lower end of cylinder 113 and force piston 116 upward, liquid being exhausted from the upper end of cylinder 113 through passage 118 and cylinder 124 to the drain pipe 32.

Piston 116 will move piston 115 upward and cause it to draw liquid into cylinder 112 from pipe 4 until piston 116 stalls against the upper end of cylinder 113. The stroke of piston 115 is so adjusted by means of adjusting screw 125 that the volume of liquid withdrawn from pipe 4 will be just sufficient either to decrease the pressure therein to the pressure required to drive the load during deceleration, or to momentarily decrease the speed of motor 1 enough to decrease the torsional deflection of shaft 3 to the point required to drive the load during deceleration, or to do both, thereby preventing the energy stored in liquid, in shaft 3 or in both from causing motor 1 to overrun the measuring speed during the period of deceleration.

When switch 103 is opened at the end of the period of deceleration, motor 99 immediately stops and there is no further decrease in pump displacement but, since the pressure of the liquid in pipe 4 and the torsional deflection of shaft 3 is greater when driving the load at a constant speed than during deceleration, the motive liquid in pipe 4 would be compressed or the shafting would be twisted and cause motor 1 to momentarily lag behind the measuring speed if it were not for the deceleration compensator.

However, the instant switch 103 is opened, solenoid 129 is deenergized and spring 124 shifts valve 121 of compensator 111 to its upper position. Liquid from the gear pump then enters the upper end of cylinder 113 and forces piston 116 downward and causes piston 115 to inject into pipe 4 the same amount of liquid that it previously withdrew therefrom. The motor is thus prevented from lagging behind the measuring speed at the end of the period of deceleration.

Should it be desirable to maintain the total volume of liquid in the circuit constant, a piston 130 of the same diameter as piston 115 may be connected to each piston 116 on the end thereof opposite piston 115 and fitted in a cylinder 131 formed in the compensator casing concentric with cylinder 113, and the return pipe 5 may be connected to the cylinders 131 of compensators 110 and 111, respectively, by pipes 132 and 133. Then, when a compensator injects liquid into or subtracts liquid from pipe 4, it simultaneously subtracts from or injects into pipe 5 an equal volume of liquid.

*Figure 2*

If the prime mover to be controlled is other than a hydraulic motor, there is no stream of motive liquid into which energy may be injected and from which energy may be absorbed to keep the load in synchronism with the prime mover. Therefore, it is necessary to provide means for performing mechanically the same function that is performed hydraulically in the apparatus shown in Fig. 1.

This is accomplished by varying the deflection of the power transmitting elements, and it is immaterial whether the prime mover is an electric motor, a steam engine or other type of prime mover as long as it is controlled by a controller of the type disclosed in the application referred to above.

For the purpose of illustration, the controller is shown in Fig. 2 as being employed to maintain the speed of an electric motor 201 proportional to a standard or measuring speed which may be constant and derived from any suitable source such as a synchronous electric motor 202. The speed of motor 201 may be varied by means of a rheostat 203 which is operated by a hydraulic servo-motor 204 consisting of a piston 205 fitted in a cylinder 206 and urged upward by a spring 207. Piston 205 has its stem 208 connected by a link 209 to the contact arm 210 of rheostat 203.

Servo-motor 204 is controlled by mechanism which is substantially the same as the mechanism that controls the servo-motor shown in Fig. 1 and previously described. Consequently, corresponding parts have been indicated by corresponding reference numerals and no detailed description thereof will be given. It is deemed sufficient to state that the differential 50 is driven from motor 201 through a gear train 53 as previously explained, that the input end of the friction disk transmission is driven by motor 202 through a gear train 211, that rod section 74a of the follow up mechanism is connected to the contact arm 210 of rheostat 203, and that surge compensator 24 is of the mechanical type illustrated and described in the application referred to above.

Motor 201 has its shaft 212 connected to a shaft 213 through a torque coupling 214 of the type illustrated and described in the application referred to above. Torque coupling 214 operates surge compensator 24 through a bell crank lever 215 in response to sudden variations in load as explained in said application.

The present invention has a particular reference to the driving of a load which is placed at such a great distance from the prime mover that the connecting shafting is so long that it has considerable twist or torsional deflection. Unless preventative means were provided, the additional force (either positive or negative) required to vary the speed of the load would cause a variation in the torsional deflection of the long shafting during a period of acceleration or deceleration with the result that the load would not be accelerated or decelerated synchronously with the acceleration or deceleration of the prime mover, and the period during which the speed of the load changed would continue beyond the period during which the speed of the prime mover was changed.

For the purpose of illustration, motor 201 is shown as being adapted to drive a load 216 through shafting which is of a considerable length and is connected to mechanism to compensate for the inertia of the load.

As shown, shaft 213 has a pinion 217 fixed thereon and in mesh with an external ring gear 220 having an elongated hollow hub 221 which is journaled in a stationary bearing 222. A shaft 223 is journaled in hub 221 and has a sun gear 224 fixed upon one end thereof and in mesh with a planet pinion 225 which is arranged upon a stub shaft 226 carried by a spoke of ring gear 220. Planet pinion 225 also meshes with an internal ring gear 227 fixed upon one end of a shaft 228 the other end of which is connected to load 216.

The arrangement is such that, when motor 201 is energized and sun gear 224 is held stationary, pinion 217 will rotate ring gear 220 which will carry planet pinion 225 around sun gear 224, and planet pinion 225 will rotate ring gear 227 which will rotate shaft 228 and thereby drive load 216. Sun gear 224 is normally held stationary by a lever 230 which is fixed upon the opposite end of shaft 223 and connected by links 231 to the motor piston 232 of an inertia load compensator 233.

Motor piston 232 is fitted in a stationary cylinder 234 and provided upon each of its ends with a suitable stem or rod one of which extends through the upper end of cylinder 234 and is connected to the lower end of links 231 and the other of which extends through the lower end of cylinder 234 and is connected by means of a pin and slot connection 235 to one end of a lever 236 which is pivoted intermediate its end upon a stationary pin 237.

Motor piston 232 is adapted to be operated by liquid supplied to cylinder 234 by gear pump GP under the control of a follow-up valve 239 having two spaced apart heads or pistons formed thereon and closely fitted in a cylinder 240 which is connected at each of its ends to drain pipe 32 and intermediate its ends to supply pipe 39. Cylinder 240 has two annular ports 241 and 242 formed therein upon opposite sides of the entrance to pipe 39 and connected, respectively, to the upper and lower ends of cylinder 234 by channels 243 and 244.

Ports 241 and 242 are spaced apart the same distance that the pistons on valve 239 are spaced apart and each port is ordinarily made the same width as the corresponding valve piston so that, when valve 239 is in its central or neutral position, both of ports 241 and 242 are blocked by the pistons on valve 239 and motor piston 232 is held stationary by liquid trapped in the ends of cylinder 234, thereby holding sun gear 224 stationary.

The arrangement is such that, when valve 239 is shifted in one direction, liquid will flow from pipe 39 through valve cylinder 240 and one channel 243 or 244 to one end of motor cylinder 234 and move piston 232 in the same direction, and piston 232 will eject liquid from the other end of cylinder 234 through the other channel 243 and 244 and through valve cylinder 240 into drain pipe 32. In order to prevent piston 232 from being operated so suddenly that it would produce shock in the mechanism, a throttle valve 245 may be provided to restrict the flow of liquid through channel 244.

Lever 236 has its other end connected by a link 250 to a lever 251 intermediate the ends thereof. Lever 251 has one of its ends connected to the stem of valve 239 and its other end connected to a centering device, represented by two opposed springs 252 and 253 which tend to hold lever 251 in such a position that motor piston 232 is retained in a predetermined position, for instance, midway between the ends of cylinder 234.

Valve 239 is adapted to be shifted in one direction or the other by two solenoids 254 and 255 which are arranged upon opposite sides of lever 251 and have the armatures thereof connected thereto. Solenoids 254 and 255 are connected to a source of electric energy in parallel with speed change motor 99 and are controlled, respectively, by push button switches 102 and 103 which also control motor 99. The distance through which valve 239 may be shifted by the solenoids is limited by two stop screws 256 and 257 arranged upon opposite sides of lever 251.

When solenoid 254 is energized, it will swing lever 251 upon link 250 and cause its right end to compress spring 252 and its left end to move valve 239 upward, as viewed in the drawings until lever 251 engages stop screw 256. Moving valve 239 upward opens port 241 to drain pipe 32 and port 242 to supply pipe 39 so that liquid from gear pump GP may flow through cylinder 240 and passage 244 to the lower end of cylinder 234 and raise piston 232 which, acting through links 231 and lever 230 will rotate shaft 223 and sun gear 224 in a clockwise direction as viewed in the drawings.

As piston 232 moves upward, it will swing lever 236 upon pin 237 and cause it to lower link 250, thereby swinging lever 251 upon stop screw 256 as a pivot and causing it to lower valve 239 at a rate proportional to the rate at which piston 232 rises. Piston 232 will continue to rise and rotate sun gear 224 until, acting through the above described linkage, it has moved valve 239 downward to its neutral position at which time ports 241 and 242 are blocked so that piston 232 is held in its new position. Also, lever 251 will at this time be parallel to its initial position but in a lower plane.

Then, when switch 102 is opened to deenergize solenoid 254, spring 252 will raise the right end of lever 251 to its initial position and lever 251 will pivot upon link 250 and lower valve 239, thereby opening port 241 to supply pipe 39 and port 242 to drain pipe 32. Liquid from pipe 39 may then flow through cylinder 240 and passage 243 to the upper end of cylinder 234 and lower piston 232 which, acting through links 231 and lever 230, will rotate shaft 223 and sun gear 224 in a counterclockwise direction.

As piston 232 moves downward, it will swing lever 236 upon pin 237 and cause it to raise link 250, thereby swinging lever 251 upward and causing it to raise valve 239 at a rate proportional to the rate at which piston 232 descends. Piston 232 will continue to descend and rotate sun gear 224 until, acting through the above described linkage, it will have moved valve 239 upward to its neutral position at which time sun gear 224 will have been rotated to its initial position, piston 232 and lever 251 will have been returned to their initial positions and ports 241 and 242 will be blocked so that piston 232 will be held stationary.

When solenoid 255 is energized, it will swing lever 251 upon link 250 and cause its right end to compress spring 253 and its left end to move valve 239 downward until lever 251 engages stop screw 257. Moving valve 239 downward opens port 242 to drain pipe 32 and port 241 to supply pipe 39 so that liquid from gear pump GP may flow through cylinder 240 and passage 243 to the upper end of cylinder 234 and lower piston 232 which, acting through links 231 and lever 230, will rotate shaft 223 and sun gear 224 in a counterclockwise direction.

As piston 232 moves downward, it will swing lever 236 upon pin 237 and cause it to raise link 250, thereby swinging lever 251 upward upon stop screw 257 as a pivot and causing it to raise valve 239 at a rate proportional to the rate at which piston 232 descends. Piston 232 will continue to descend and rotate sun gear 224 until, acting through the above described linkage, it has moved valve 239 upward to its neutral position at which time ports 241 and 242 are blocked so that piston 232 is held in its new position. Also, lever 251 will be parallel to its initial position but in a higher plane.

Then, when solenoid 255 is deenergized, spring 253 will lower the right end of lever 251 to its initial position and lever 251 will pivot upon link 250 and raise valve 239, thereby opening port 242 to supply pipe 39 and port 241 to drain pipe 32. Liquid from pipe 39 may then flow through cylinder 240 and passage 244 to the lower end of cylinder 234 and raise piston 232 which, acting through links 231 and lever 230 will rotate shaft 223 and sun gear 224 in a clockwise direction.

As piston 232 moves upward, it will swing lever 236 upon pin 237 and cause it to lower link 250, thereby swinging lever 251 downward and causing it to lower valve 239 at a rate proportional to the rate at which piston 232 rises. Piston 232 will continue to rise and rotate sun gear 224 until, acting through the above described linkage, it has moved valve 239 downward to its neutral position at which time sun gear 224 will have been rotated to its initial position, piston 232 and lever 251 will be in their initial positions and ports 241 and 242 will be blocked so that piston 232 will be held stationary.

During normal operation, the controller will function to keep the speed of motor 201 synchronized with the standard or measuring speed as fully explained in the application referred to above.

When switch 102 is closed, motor 99 and solenoid 254 will be simultaneously energized. Motor 99 will adjust the control mechanism to gradually accelerate motor 201 which will accelerate the load 216.

The additional force required to accelerate the load will cause additional torsional deflection of the shafting and a resultant delay in accelerating the load were it not for the inertia compensator. However, the instant switch 102 is closed, solenoid 254 shifts valve 239 to effect operation of piston 232 which rotates sun gear 224 in a direction to increase the torsional deflection of the shafting, the amount of additional torsional deflection being determined by adjustment of stop screw 256 which is adjusted to cause piston 232 to rotate sun gear 224 through the exact angular distance necessary to increase the torsional deflection of the shafting by the same amount it would be increased due to accelerating the load. Consequently, the load is accelerated synchronously with motor 201.

When switch 102 is opened to stop the acceleration of motor 201, solenoid 254 is instantly deenergized so that piston 232 rotates sun gear 224 through the same angular distance as previously but in the opposite direction with the result that the torsional deflection of the shafting is reduced the exact amount that it was previously increased. Consequently, the load will not overrun the desired speed at the end of the period of acceleration.

When switch 103 is closed, motor 99 and solenoid 255 will be simultaneously energized. Motor 99 will adjust the control mechanism to gradually decelerate motor 201 which will decelerate load 216.

Since less force is required to drive the load during deceleration than is required to drive it at a constant speed, there will be less torsional deflection of the shafting during the deceleration period than during a constant speed period. Therefore, when motor 201 slows down, the energy stored in the shafting tends to cause the load to run ahead of the motor.

However, the instant switch 103 is closed, solenoid 255 shifts valve 239 to effect operation of piston 232 which rotates sun gear 224 in a direction to decrease the torsional deflection of the shafting, the amount of decrease in torsional deflection being determined by adjustment of stop screw 257 which is adjusted to cause piston 232 to rotate sun gear 224 through the exact angular distance necessary to decrease the torsional deflection of the shafting by the same amount it would be decreased due to decelerating the load. Consequently, the load is decelerated synchronously with motor 201.

When switch 103 is opened to stop the deceleration of motor 201, solenoid 255 is instantly deenergized so that piston 232 rotates sun gear 224 through the same angular distance as previously but in the opposite direction with the result that the torsional deflection of the shafting is increased the exact amount that it was previously decreased. Consequently, the load will not underrun the desired speed at the end of the period of deceleration.

The invention herein set forth is susceptible of various modifications and adaptations without departing from the scope thereof as hereafter claimed.

The invention is hereby claimed as follows:

1. The combination, with a load, a variable speed prime mover for driving said load, a source of energy for said prime mover and transmission lines for the transmission of energy from said source to said prime mover and from said prime mover to said load, of a controller for controlling said prime mover and operable to maintain the speed thereof proportional to a standard or measuring speed, means for adjusting said controller to change the speed of said prime mover to a speed having a different ratio to said standard speed whereby an additional positive or negative force is required to overcome the inertia of said load during such speed change, and means connected to one of said transmission lines and energized from another source for overcoming the inertia of said load.

2. The combination, with a load, a variable speed prime mover for driving said load, a source of energy for said prime mover and transmission lines for the transmission of energy from said source to said prime mover and from said prime mover to said load, of a controller for controlling said prime mover and operable to maintain the speed thereof proportional to a standard or measuring speed, means for adjusting said controller to change the speed of said prime mover to a speed having a different ratio to said standard speed whereby an additional positive or negative force is required to overcome the inertia of said load during such speed change, and means operated in unison with said controller adjusting means and connected to one of said transmission lines and energized from another source for overcoming the inertia of said load.

3. The combination, with a load, a variable speed prime mover for driving said load, a source of energy for said prime mover and transmission lines for the transmission of energy from said source to said prime mover and from said prime mover to said load of a controller for controlling said prime mover and operable to maintain the speed thereof proportional to a standard or measuring speed, means for adjusting said controller to change the speed of said prime mover to a speed having a different ratio to said standard speed whereby an additional positive or negative force is required to overcome the inertia of said load during such speed change, a hydraulic motor for supplying to one of said transmission lines a force substantially equal to the aforesaid additional force, and means for supplying motive liquid to said motor.

4. The combination, with a load, a variable speed prime mover for driving said load, a source of energy for said prime mover and transmission lines for the transmission of energy from said source to said prime mover and from said prime mover to said load, of a controller for controlling said prime mover and operable to maintain the speed thereof proportional to a standard or measuring speed, electrically operated means for adjusting said controller to change the speed of said prime mover to a speed having a different ratio to said standard speed whereby an additional positive or negative force is required to overcome the inertia of said load during such speed change, electromagnetically operated means connected to one of said transmission lines and energized from another source for initially overcoming the inertia of said load, and a single switch for controlling said electrically operated means and said electromagnetically operated means.

5. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, and means for imparting to one of said transmitting means from another source at the beginning of an acceleration an amount of energy sufficient to generate the required accelerating force in said transmitting means.

6. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, and means operated in unison with said controller adjusting means for imparting to one of said transmitting means from another source at the beginning of an acceleration an amount of energy sufficient to generate the required accelerating force in said transmitting means.

7. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, means for imparting to one of said transmitting means from another source at the beginning of an acceleration an amount of energy sufficient to generate the required accelerating force in said transmitting means, an electromagnet for operating energy imparting means, an electric motor for operating said adjusting means, and a single switch for controlling said magnet and said motor.

8. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, hydraulically operated means for imparting to one of said transmitting means at the beginning of an acceleration an amount of energy sufficient to generate the required accelerating force in said transmitting means, a pump for supplying fluid to said hydraulically operated means, and means for actuating said adjusting means and said hydraulically operated means simultaneously.

9. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, and means for injecting a limited volume of liquid from a separate source into the channel between said pump and said motor at the start of controller adjustment to prevent a delay in accelerating said load.

10. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, and means operated in unison with said controller adjusting means for injecting a limited volume of liquid from a separate source into the channel between said pump and said motor at the start of controller adjustment to prevent a delay in accelerating said load.

11. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, means for injecting a limited volume of liquid from a separate source into the channel between said pump and said motor at the start of controller adjustment to prevent a delay in accelerating said load, an electromagnet for operating said last named means, an electric motor for operating said adjusting means, and a single switch for controlling said magnet and said motor.

12. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, and means for injecting a limited volume of liquid from a separate source into the channel between said pump and said motor at the start of controller adjustment to prevent a delay in accelerating said load and for subtracting the same volume from said channel at the end of controller adjustment.

13. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, and means operated in unison with said controller adjusting means for injecting a limited volume of liquid from a separate source into the channel between said pump and said motor at the start of controller adjustment to prevent a delay in accelerating said load and for subtracting the same volume from said channel at the end of controller adjustment.

14. The combination, with a load, a hydraulic motor for driving said load, a pump connected to said motor by fluid channels for supplying motive liquid thereto to drive the same, and means for varying the relative displacements of said pump and motor to vary the speed of said motor, of a controller for operating said displacement varying means and operable to maintain the speed of said motor proportional to a standard or measuring speed, means for adjusting said controller to cause it to accelerate said motor and thereby accelerate said load, means for injecting a limited volume of liquid from a separate source into the channel between said pump and said motor at the start of controller adjustment to prevent a delay in accelerating said load and for subtracting the same volume from said channel at the end of controller adjustment, an electromagnet for operating said last named means, an electric motor for operating said adjusting means, and a single switch for controlling said magnet and said motor.

15. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, and means for injecting at the beginning of adjustment of said controller into one of said transmitting means from another source an amount of energy sufficient to generate the required accelerating force in said transmitting means and for subtracting therefrom the same amount of energy upon completing said adjustment of said controller.

16. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, and means operated in unison with said controller adjusting means for injecting at the beginning of adjustment of said controller into one of said transmitting means from another source an amount of energy sufficient to generate the required accelerating force in said transmitting means and for subtracting therefrom the same amount of energy upon completing said adjustment of said controller.

17. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, means for injecting at the beginning of adjustment of said controller into one of said transmitting means from another source an amount of energy sufficient to generate the required accelerating force in said transmitting means and for subtracting therefrom the same amount of energy upon completing said adjustment of said controller, an electromagnet for operating the last named means, an electric motor for operating said adjusting means, and a single switch for controlling said magnet and said motor.

18. The combination, with a load, a variable speed prime mover for driving said load, a source of energy, means for transmitting energy from said source to said prime mover and means for transmitting motion from said prime mover to said load, of a controller for maintaining the speed of said prime mover proportional to a standard or measuring speed, means for adjusting said controller to increase the speed of said prime mover and thereby accelerate said load, hydraulically operated means for injecting at the beginning of adjustment of said controller into one of said transmitting means an amount of energy sufficient to generate the required accelerating force in said transmitting means and for subtracting therefrom the same amount of energy upon completing said adjustment of said controller, means for supplying liquid to said hydraulically actuated means, and means for actuating said adjusting means and said hydraulically operated means simultaneously.

19. The combination, with a hydraulic motor, a pump, a fluid channel for directing the output of said pump to said motor and means for varying the relative displacements of said pump and motor, of a controller for operating said displacement varying means to thereby vary the speed of said motor and operable to maintain motor speed proportional to a standard or measuring speed, means for adjusting said controller to thereby change motor speed relative to said standard speed, an acceleration compensator for injecting a predetermined volume of liquid into said channel and for withdrawing the same volume therefrom, and means responsive to said adjusting means being operated to accelerate said motor for causing said acceleration compensator to inject liquid into said channel and responsive to said adjusting means ceasing to operate for causing said acceleration compensator to withdraw liquid from said channel.

20. The combination, with a hydraulic motor, a pump, a fluid channel for directing the output of said pump to said motor and means for varying the relative displacements of said pump and motor, of a controller for operating said displacement varying means to thereby vary the speed of said motor and operable to maintain motor speed proportional to a standard or measuring speed, means for adjusting said controller to thereby change motor speed relative to said standard speed, an acceleration compensator and a deceleration compensator for injecting a predetermined volume of liquid into said channel and for withdrawing the same volume therefrom, means responsive to said adjusting means being operated to accelerate said motor for causing said acceleration compensator to inject liquid into said channel and responsive to said adjusting means ceasing to operate for causing said acceleration compensator to withdraw liquid from said channel, and means responsive to said adjusting means being operated to decelerate said motor for causing said deceleration compensator to withdraw liquid from said channel and responsive to said adjusting means ceasing to operate for causing said deceleration compensator to inject liquid into said channel.

WALTER FERRIS.